(12) United States Patent
Minamiura et al.

(10) Patent No.: US 6,541,151 B2
(45) Date of Patent: Apr. 1, 2003

(54) BATTERY ASSEMBLY SYSTEM USED FOR ELECTRIC VEHICLE

(75) Inventors: Keiichi Minamiura, Aichi (JP); Toshiaki Nakanishi, Aichi (JP)

(73) Assignees: Matsushita Electric Industrial Co., Ltd., Kadoma (JP); Toyota Jidosha Kabushiki Kaisha, Toyota (JP)

( * ) Notice: Subject to any disclaimer, the term of this patent is extended or adjusted under 35 U.S.C. 154(b) by 188 days.

(21) Appl. No.: 09/822,670

(22) Filed: Mar. 30, 2001

(65) Prior Publication Data

US 2001/0026887 A1 Oct. 4, 2001

(30) Foreign Application Priority Data

Mar. 31, 2000 (JP) ........................................ 2000-099363

(51) Int. Cl.⁷ ........................ H01M 2/10; H01M 10/42; B60R 16/04
(52) U.S. Cl. .............................. 429/98; 429/72; 429/84; 429/71; 429/74; 429/120; 429/86; 180/68.5; 307/10.7
(58) Field of Search ............................. 429/98, 120, 86, 429/71, 72, 74, 82, 84; 180/68.5; 307/10.7

(56) References Cited

U.S. PATENT DOCUMENTS 5,183,222 A * 2/1993 Ramsey, Jr. ............... 244/53 R
5,643,691 A   7/1997 Iwatsuki et al.

FOREIGN PATENT DOCUMENTS

| JP | 7-245089 | 9/1995 |
| JP | 10-252467 | 9/1998 |
| JP | 11-339747 | 12/1999 |

* cited by examiner

Primary Examiner—Patrick Ryan
Assistant Examiner—Angela J Martin
(74) Attorney, Agent, or Firm—Merchant & Gould, P.C.

(57) ABSTRACT

A battery assembly system used for an electric vehicle having a configuration in which electrolyte is not released from an exhaust passage even if the electrolyte is released in a mist state from a cell. A battery assembly case is provided behind a rear seat in a cabin. An exhaust duct having a cooling fan is connected to the battery assembly case, and an air inlet port is provided to the battery assembly case at the side opposite to the portion where the exhaust duct is connected. As the cooling fan, a sirocco fan or an axial-flow fan is used. The air for forcibly cooling the battery assembly is allowed to flow in the cabin, the air inlet port, the battery assembly case, the exhaust duct, the cooling fan, and the exhaust duct in this order. A mist state electrolyte released from the cell together with the air is allowed to collide with and is attached to a cascade of the fan or the wall surface of the fan.

12 Claims, 12 Drawing Sheets

BATTERY ASSEMBLY SYSTEM USED FOR ELECTRIC VEHICLE

BACKGROUND OF THE INVENTION

1. Field of the Invention

The present invention relates to a battery assembly system used for an electric vehicle. In particular, the present invention relates to a battery assembly system capable of suppressing flow of electrolyte out of an exhaust passage when an abnormality occurs in cells composing the battery assembly and the electrolyte is released in a mist state from the cells.

2. Description of the Prior Art

In general, a battery assembly with a plurality of cells connected in series or in parallel is mounted in an electric vehicle such as an electric car, etc., in order to supply a motor etc. with power for driving a vehicle. In this case, due to the variation of the battery characteristic, electric currents are concentrated on a specific cell, or overcharge or overdischarge of the cell easily occurs. When such overcharge or overdischarge of the cell, or internal shorts in the cell occur, a safety valve or a battery case may be damaged. As a result, an electrolyte may be released in a mist state from the damaged portion.

A battery used for this kind of application can be used over a longer term, if the working temperature is always in the predetermined range. Therefore, in order to secure and extend a lifetime of battery, a branching is provided at a middle portion of a duct for introducing air into a cabin from the outside the car, and a duct for introducing air into a case for housing a battery assembly is connected to this branching portion. Furthermore, an exhaust duct for exhausting the introduced air is connected to the case for housing the battery assembly.

The air flowing in the exhaust duct is allowed to return to a cabin. JP10 (1998)-252467A suggests a technique in which, when the abnormality occurs in the cells, gas is prevented from flowing into the cabin by providing a switching damper for releasing the air flowing in the exhaust duct to the outside of the cabin. Furthermore, JP7 (1995)-245089A discloses a mechanism in which a tube is provided for a safety valve of a cell, thereby capturing mists without using a switching damper.

However, when the abnormality occurs in the cell, if employing the configuration having the switching damper for releasing the air flowing in the exhaust duct to the outside of the cabin, the system is somewhat complicated. Furthermore, if air is always allowed to exhaust to the outside of the car, the efficiency of heating and cooling in the cabin is deteriorated.

On the other hand, with the mechanism in which a tube is provided for the safety valve of the cell so as to capture the mist, the cost is increased in the apparatus. Furthermore, when a battery case is made of a resin, the strength of the battery case is lower than the strength of a metal battery case. Therefore, when the battery case is damaged due to overcharge or overdischarge of a cell or internal short in the cell, the mist-state electrolyte may flow into the exhaust duct.

SUMMARY OF THE INVENTION

It is an object of the present invention to solve the conventional problems described above by providing a simple and inexpensive battery assembly system used for an electric vehicle, which can suppress the flow of electrolyte out of an exhaust passage even if the electrolyte is released in a mist state from the cell.

In order to achieve the above-mentioned object, a configuration of a battery assembly system used for an electric vehicle of the present invention includes a battery assembly with a plurality of cells electrically connected, a battery assembly case for housing the battery assembly with the battery assembly mechanically held, a fan for drawing air into the inside of the battery assembly case, and an exhaust passage for allowing air to be exhausted from the battery assembly case, wherein the exhaust passage is provided with a mechanism for capturing an electrolyte released in a mist state from the cell. According to such a configuration of the battery assembly system used for an electric vehicle, it is possible to suppress the flow of electrolyte released from a damaged portion of the safety valve or the battery case of the cells out of the exhaust passage.

Furthermore, in the configuration of the battery assembly system used for the electric vehicle of the present invention, it is preferable that a fan is provided in the exhaust passage and the electrolyte is captured by the fan. According to such a preferable configuration, it is possible to prevent a mist-state electrolyte from flowing out of the exhaust passage by the use of existing components of the battery assembly system. Furthermore, in this case, it is preferable that the fan is a sirocco fan or an axial-flow fan. According to such a preferable configuration, it is possible to capture the mist-state electrolyte effectively since a part of the mist-state electrolyte collides with and is attached to the cascade of the fan and a part of the rest of the mist-state electrolyte collides with and is attached to the wall surface of the fan by the inertial force.

Furthermore, in the configuration of the battery assembly system used for the electric vehicle of the present invention, it is preferable that a filter further is provided in the exhaust passage and the electrolyte is captured by the filter. According to such a preferable configuration, the electrolyte released in a mist state from the damaged portion of the safety valve or battery case of the cell collides with and is attached to the filter. In other words, the mist-state electrolyte released from the cell is captured in the exhaust passage. Thus, it is possible to suppress the release of mist-state electrolyte out of the exhaust passage. Furthermore, in this case, it is preferable that the filter can capture the electrolyte released in a mist state having a particle size of 1 $\mu$m to 50 $\mu$m. According to such a preferable configuration, it is possible to capture the mist-state electrolyte having a small diameter and higher scattering property. The mist has a nature in that as the particle diameter of the mist is smaller, the scattering property of the mist is increased. Therefore, unless the filter can capture the mist having particles at least as small as the particle size mentioned above, i.e. particle size of 1 $\mu$m to 50 $\mu$m, the filter is not as useful for practical purposes.

Furthermore, in the configuration of the battery assembly system used for the electric vehicle of the present invention, it is preferable that the exhaust passage is an exhaust duct.

Furthermore, in the configuration of the battery assembly system used for the electric vehicle of the present invention, it is preferable that the exhaust passage is an exhaust duct and the exhaust duct has a bend portion for capturing the electrolyte. According to such a preferable configuration, a part of the mist-state electrolyte collides with and is attached to the wall surface of the bend portion by the inertial force and a part of the rest of the mist-state electrolyte collides with and is attached to the wall surface of the exhaust duct by the air that is made turbulent by the bend portion. Thus, the mist-state electrolyte released from the cell is captured in the exhaust duct and its flow out of the exhaust duct is suppressed. Furthermore, in this case, it is preferable that the bend portion is provided with an angle of 60° to 160°. According to such a preferable configuration, it is possible to capture efficiently the mist-state electrolyte released from the cell in the exhaust duct.

Furthermore, in the configuration of the battery assembly system used for the electric vehicle of the present invention, it is preferable that the exhaust passage is an exhaust duct and the exhaust duct is provided with convex and concave portion on the inner wall for capturing the electrolyte. According to such a preferable configuration, the mist-state electrolyte is attached to the convex and concave portion on the inner wall and captured in the exhaust duct.

Furthermore, if at least two of the configurations of the present invention are provided, it is possible to capture the mist state electrolyte released from the cell in the exhaust passage reliably.

Furthermore, in the configuration of the battery assembly system used for the electric vehicle of the present invention, it is preferable that the electrolyte released a mist state from the cell is an alkaline electrolyte including potassium hydroxide as a main component, and the aerial concentration of the potassium hydroxide in the air of the cabin of the electric vehicle is 2 $mg/m^3$ or less. Furthermore, it is preferable that the aerial concentration of the potassium hydroxide is 0.3 $mg/m^3$ or less.

DESCRIPTION OF THE PREFERRED EMBODIMENTS

Hereinafter, the present invention will be described more specifically by way of embodiments.
[First Embodiment]

Figure 1:
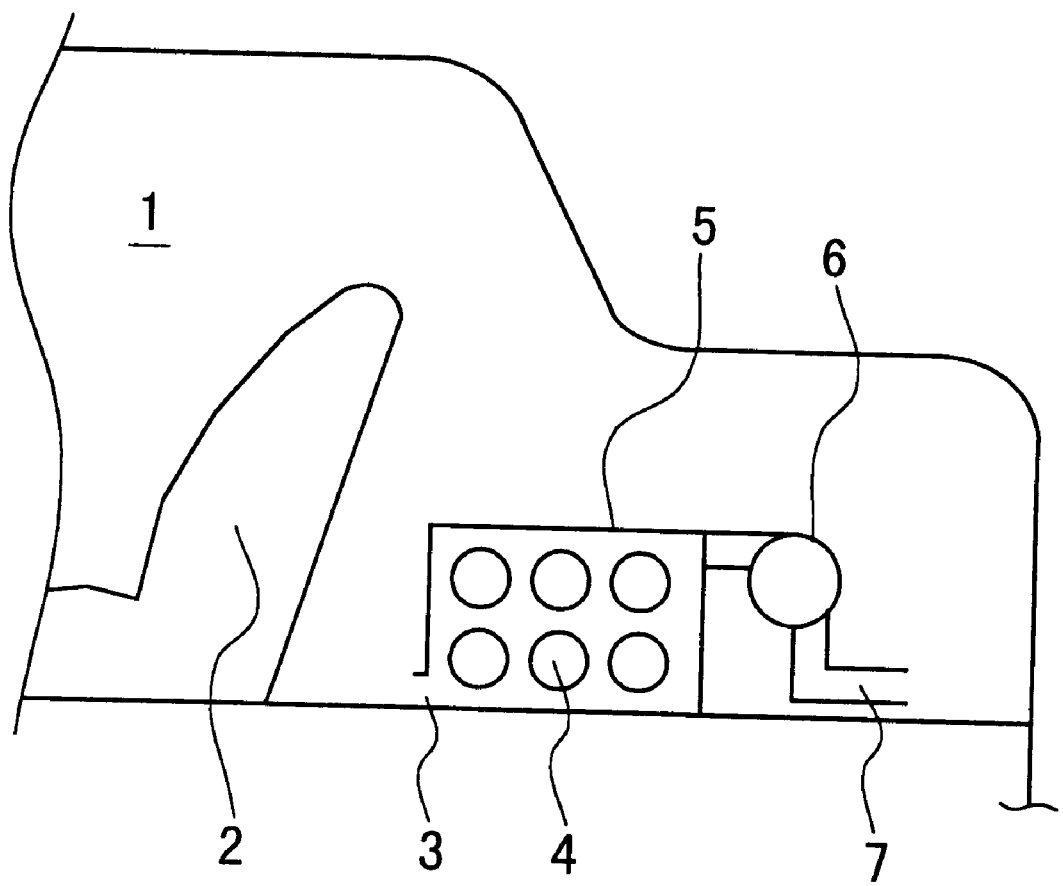
FIG. 1 is a schematic view showing a rear side of a hybrid electric vehicle on which a battery assembly system is mounted according to a first embodiment of the present invention.
Figure 2:
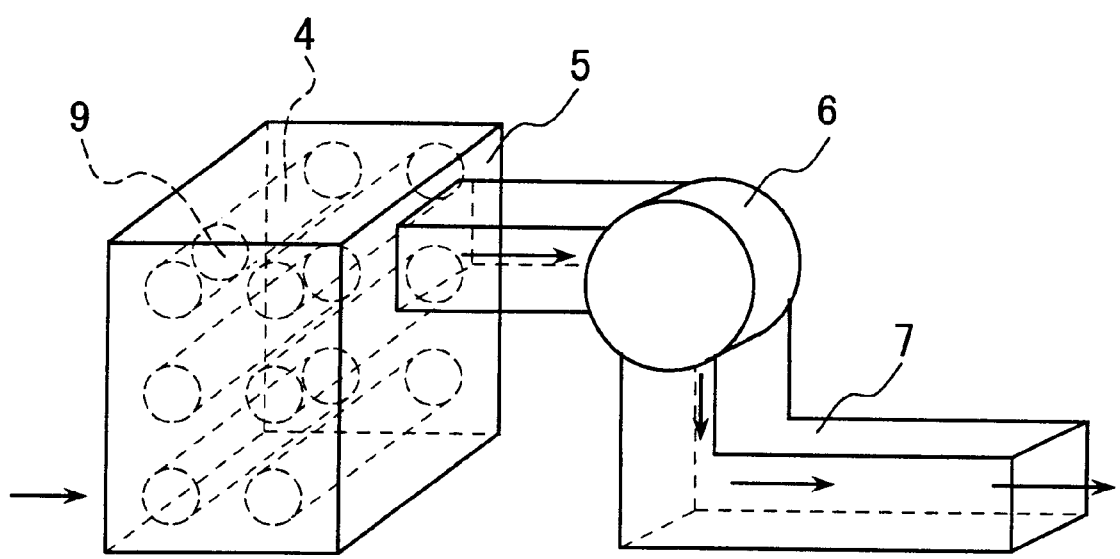
FIG. 2 is a perspective view showing one example of the battery assembly system according to the first embodiment of the present invention.

FIG. 1 is a schematic view showing a rear side of a hybrid electric vehicle on which a battery assembly system is mounted according to a first embodiment of the present invention; and FIG. 2 is a perspective view showing one example of the battery assembly system.

As shown in FIG. 1, a battery assembly case 5 is provided behind a rear seat 2 in a cabin 1. As shown in FIGS. 1 and 2, the battery assembly case 5 houses a battery assembly 4 with a plurality of cells 9 electrically connected. Herein, the battery assembly case 5 has a structure capable of mechanically holding the battery assembly 4.

Since the battery assembly 4 is heated due to an electric current when it is charged and discharged repeatedly, it requires cooling. Therefore, an exhaust duct 7 having a cooling fan 6 is connected to the battery assembly case 5, and an air inlet port 3 is provided to the battery assembly case 5 at the side opposite to the portion where the exhaust duct is connected. Herein, the cooling fan 6 is provided in the middle portion in the exhaust duct 7. Namely, the exhaust duct 7 is connected between the battery assembly case 5 and the cooling fan 6 and also behind the cooling fan 6. Therefore, by operating the cooling fan 6 so as to draw the air into the battery assembly case 5 from the air inlet port 3, and exhausting the drawn air from the exhaust duct 7, it is possible to cool the battery assembly 4 in the battery assembly case 5 forcibly. Inside the battery assembly case 5 with the battery assembly 4 housed, an appropriate air flowing passage is secured so as to cool the battery assembly 4 by the flow of the air drawn by the cooling fan 6.

When a safety valve or a battery case is damaged due to overcharge or overdischarge of the cell 9 or the internal short of the cell 9, electrolyte is released in a mist state from the damaged portion of the safety valve or battery case. In such a case, some part of the mist-state electrolyte may drop onto the battery assembly case 5 or be attached to the wall surface of the battery assembly case 5, and some part of the mist-state electrolyte may be exhausted from the exhaust duct 7 together with the air drawn by the cooling fan 6.

In this embodiment, in order to suppress the flow of mist-state electrolyte out of the exhaust duct 7, the cooling fan 6 having a following structure is used.

Figure 3:
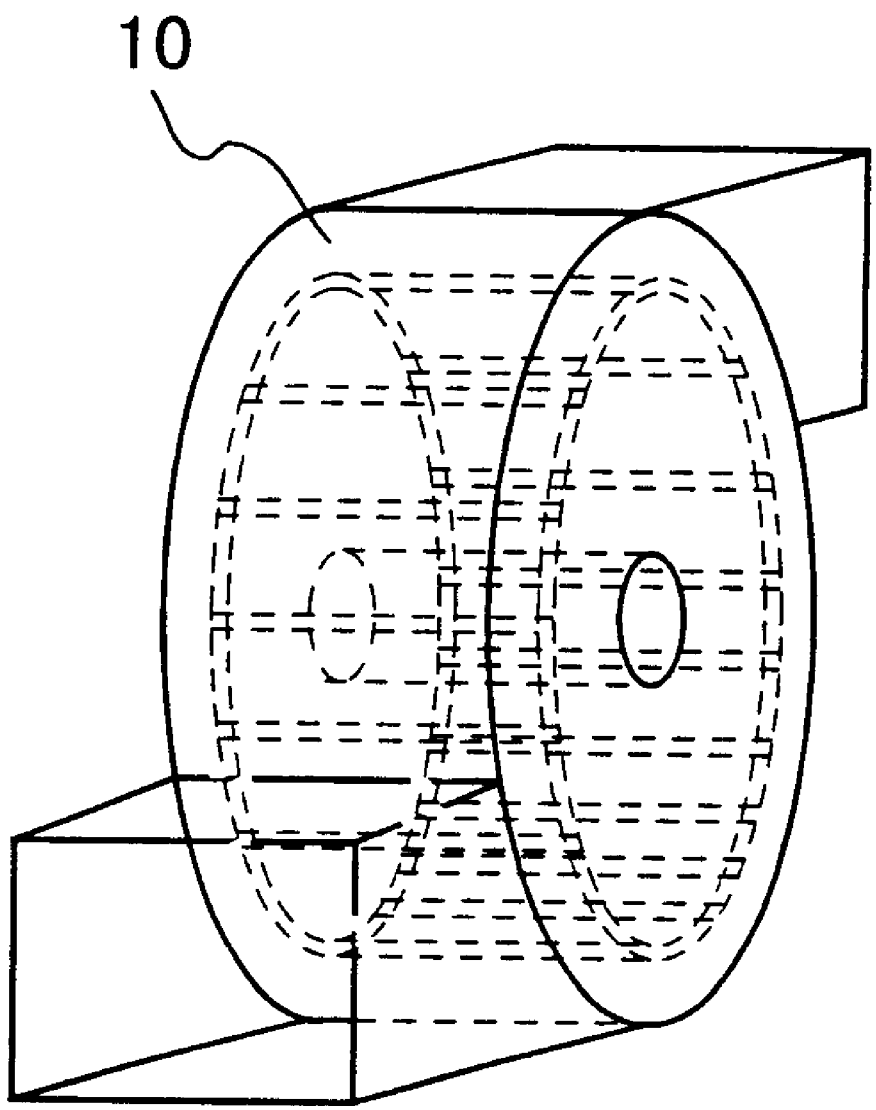
FIG. 3 is a perspective view showing one example of a cooling fan used for the battery assembly system according to the first embodiment of the present invention.
Figure 4:
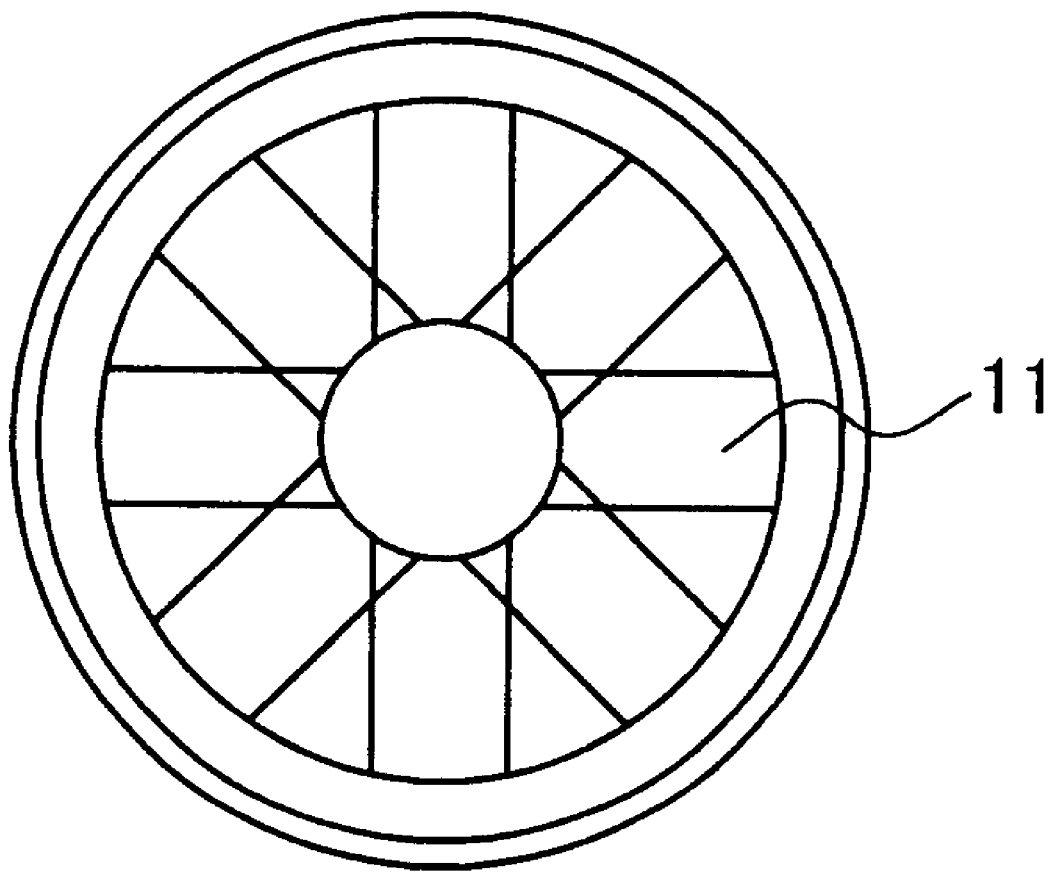
FIG. 4 is a front cross sectional view showing another example of a cooling fan used for the battery assembly system according to the first embodiment of the present invention.

FIGS. 3 and 4 show a structure of a cooling fan used in this embodiment. The cooling fan shown in FIG. 3 is a sirocco fan (a fan forcibly feeding air in the direction orthogonal to the axis direction by the rotation of a cascade) 10; and FIG. 4 is an axial-flow fan (a fan forcibly feeding air in the axis direction by the rotation of a cascade) 11. In this case, air for forcibly cooling the battery assembly 4 flows in the cabin 1, an air inlet port 3, the battery assembly case 5, the exhaust duct 7, the cooling fan 6 and the exhaust duct 7 in this order. Therefore, when the mist-state electrolyte, which is released from the cell 9 together with the air, flows in a turbulent state into the cooling fan 6 having the above-mentioned structure, a part of the mist-state electrolyte collides with and is attached to the cascade of the fan and a part of the rest of the mist-state electrolyte collides with and is attached to the wall surface of the fan by the inertial force. Therefore, the cooling fan 6 provided to the exhaust duct 7 can capture the mist-state electrolyte effectively.

As mentioned above, according to this embodiment, the mist-state electrolyte released from the cell 9 is allowed to be captured by the cooling fan 6 provided to the exhaust duct 7. Thereby, it is possible to suppress the mist-state electrolyte from flowing out of the exhaust duct 7.

Figure 5:
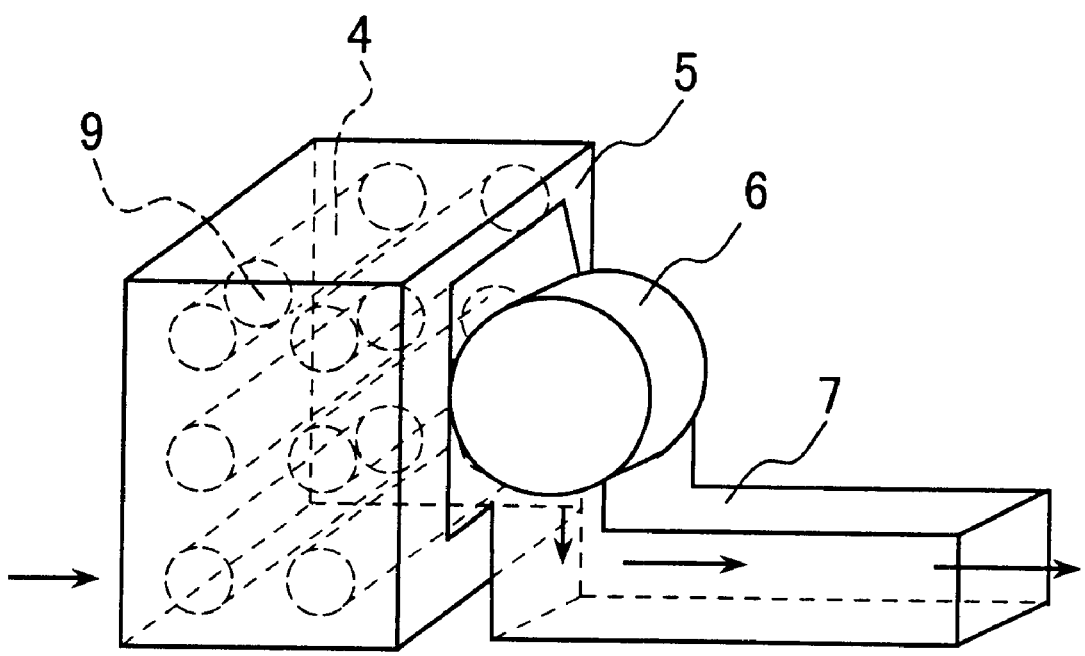
FIG. 5 is a perspective view showing another example of the battery assembly system according to the first embodiment of the present invention.

In this embodiment, the case where the cooling fan 6 is provided in the middle portion of the exhaust duct 7 is described. However, even if the cooling fan is connected directly to the battery assembly case 5 as shown in FIG. 5, the same effect can be obtained.

[Second Embodiment]

Figure 6:
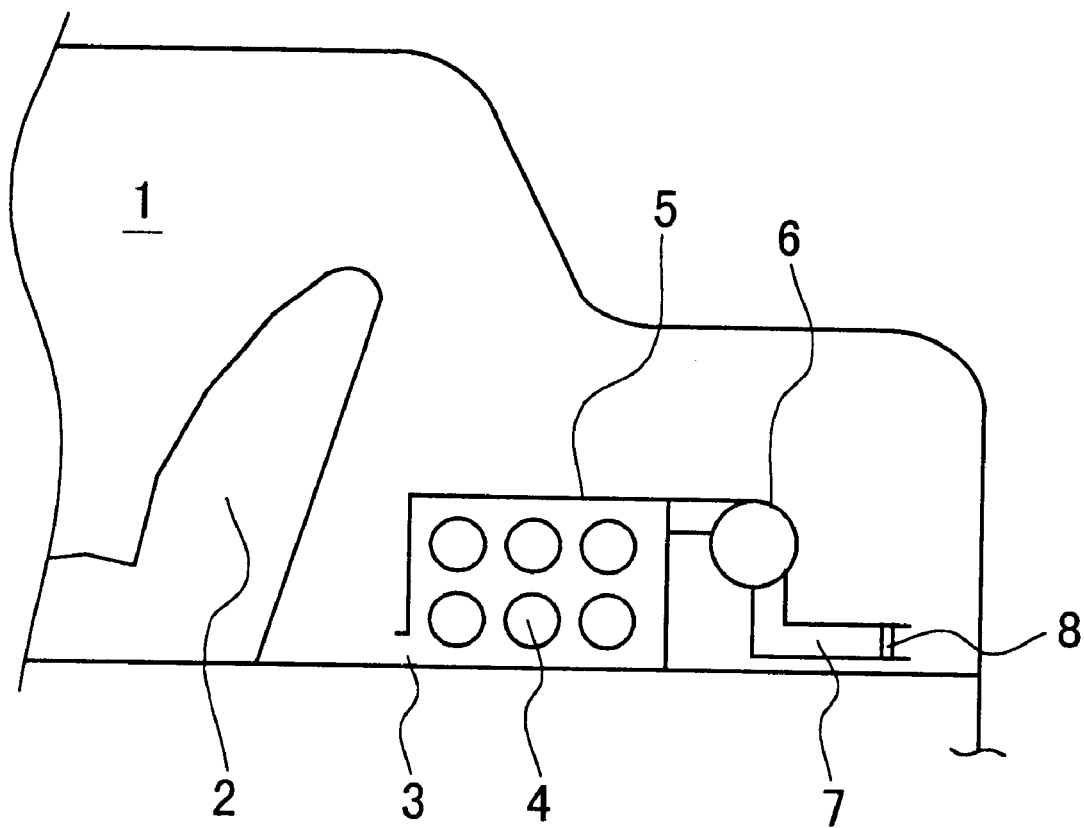
FIG. 6 is a schematic view showing a rear side of a hybrid electric vehicle on which a battery assembly system is mounted according to a second embodiment of the present invention.
Figure 7:
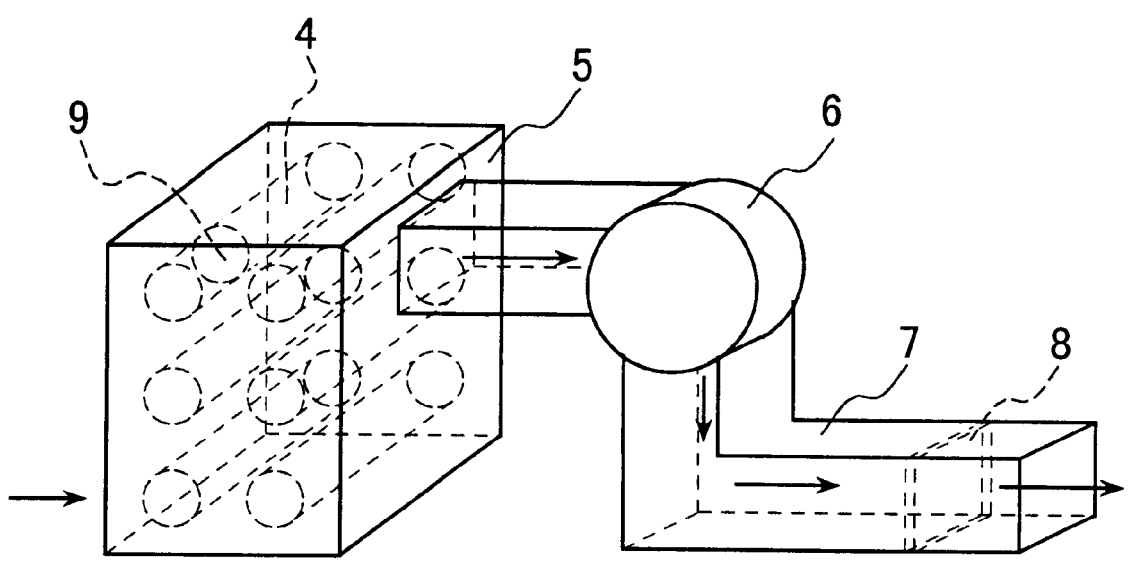
FIG. 7 is a perspective view showing one example of the battery assembly system according to the second embodiment of the present invention.

FIG. 6 is a schematic view showing a rear side of a hybrid electric vehicle on which a battery assembly system is mounted according to a second embodiment of the present invention; and FIG. 7 is a perspective view showing one example of the battery assembly system.

As shown in FIGS. 6 and 7, an exhaust duct 7 having a cooling fan 6 is connected to a battery assembly case 5, and an air inlet port 3 is provided to the battery assembly case 5 at the side opposite to the portion where the exhaust duct is connected. Herein, the cooling fan 6 is provided in the middle portion of the exhaust duct 7, and inside the exhaust duct 7, a filter 8 is provided downstream of the cooling fan 6.

Figure 8:
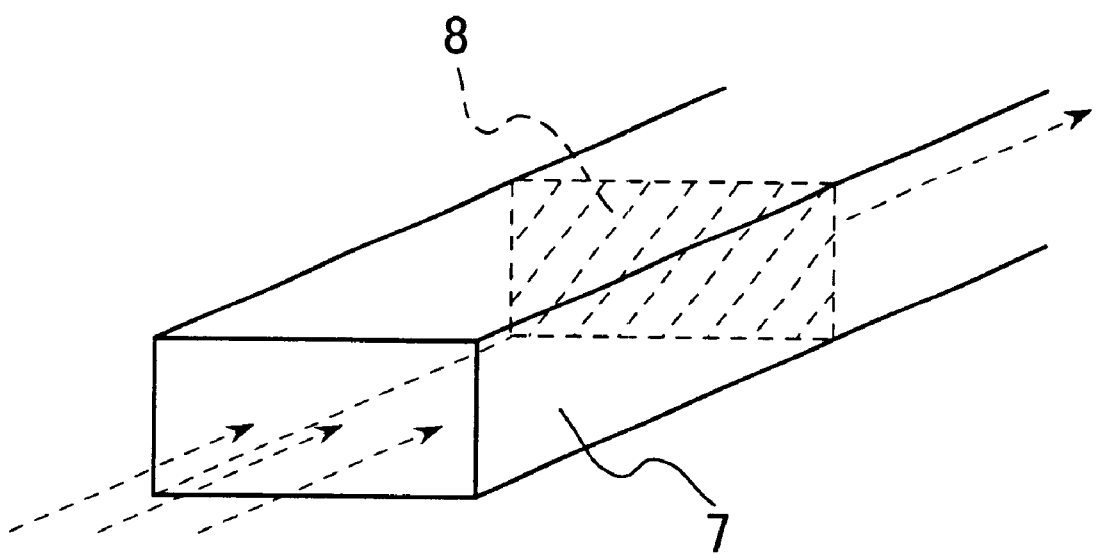
FIG. 8 is a perspective view showing a filter portion used for the battery assembly system according to the second embodiment of the present invention.

In this case, the air for forcibly cooling the battery assembly 4 flows in the cabin 1, the air inlet port 3, the battery assembly case 5, the exhaust duct 7, the cooling fan 6, the exhaust duct 7, the filter 8 and the exhaust duct 7 in this order. Therefore, when the mist-state electrolyte, which is released from the cell 9 together with air, flows into the exhaust duct 7 in a turbulent state, the mist-state electrolyte collides with and is attached to the filter 8 (see FIG. 8). Therefore, the mist-state electrolyte released from the cell 9 is captured in the exhaust duct 7, and thus it does not flow out of the exhaust duct 7.

It is desirable that the filter 8 can capture the electrolyte that is released in a mist state having a particle size of 1 $\mu$m to 50 $\mu$m, because it can capture mist-state electrolyte having a small particle size and high scattering property. Mist has a nature such that as the particle diameter of the mist is smaller, the scattering property of the mist is increased. Therefore, unless the filter 8 can capture the mist having a particle size at least as small as the particle size mentioned above, i.e. the particle size of 1 $\mu$m to 50 $\mu$m, the filter 8 is not as useful for practical purposes.

In this embodiment, the case where the filter 8 is provided behind the cooling fan 6 is described. However, the structure is not limited thereto, and even if the filter 8 is provided between the battery assembly case 5 and the cooling fan 6, the same effect can be obtained.

Furthermore, in this embodiment, the case where the cooling fan 6 is provided in the exhaust duct 7 is described. However, the cooling fan 6 is not necessarily provided in the exhaust duct 7. Even if the cooling fan 6 is provided at the side of the air inlet port 3, the predetermined purpose can be achieved.

[Third Embodiment]

Figure 9:
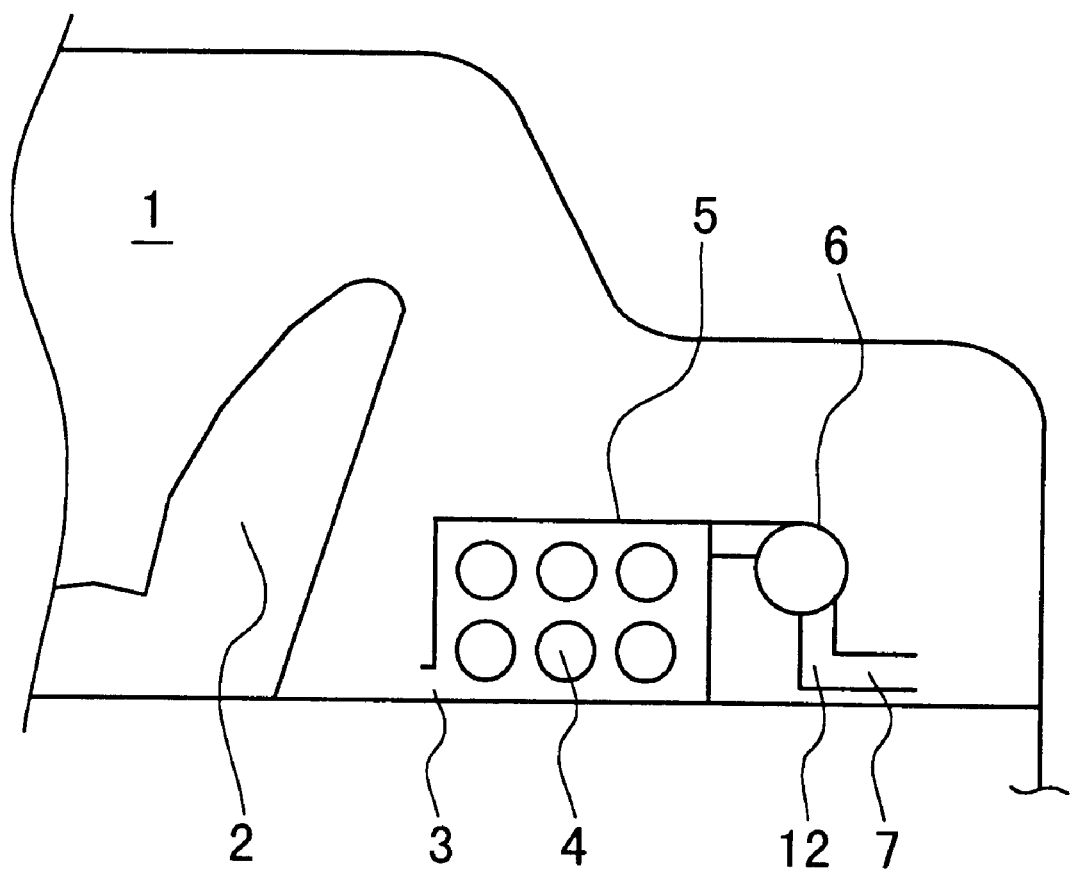
FIG. 9 is a schematic view showing a rear side of a hybrid electric vehicle on which a battery assembly system is mounted according to a third embodiment of the present invention.
Figure 10:
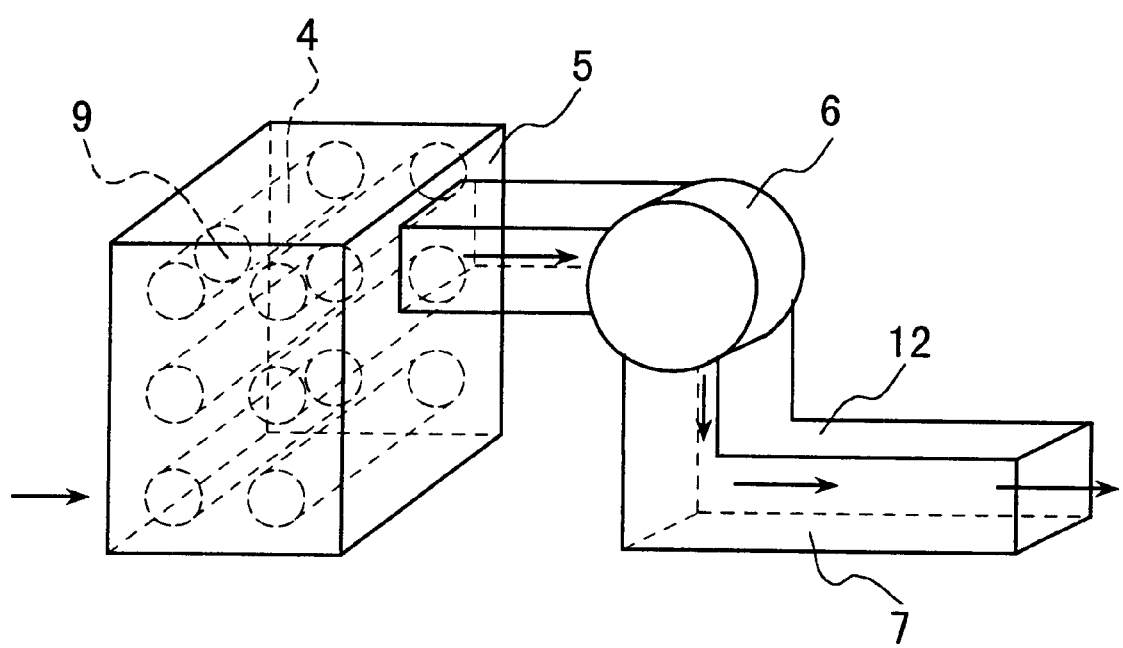
FIG. 10 is a detail perspective view showing one example of the battery assembly system according to the third embodiment of the present invention.

FIG. 9 is a schematic view showing a rear side of a hybrid electric vehicle on which a battery assembly system is mounted according to a third embodiment of the present invention; and FIG. 10 is a perspective view showing one example of the battery assembly system.

As shown in FIG. 9, also in the battery assembly system of this embodiment, similarly to the above-mentioned embodiments 1 and 2, a battery assembly case 5 housing a battery assembly 4 is provided behind a rear seat 2 in a cabin 1. An exhaust duct 7 having a cooling fan 6 is connected to the battery assembly case 5, and an air inlet port 3 is provided to the battery assembly case 5 at the side opposite to the portion where the exhaust duct is connected.

As shown in FIGS. 9 and 10, the exhaust duct 7 is provided with a bend portion 12 behind the cooling fan 6.

Figure 11:
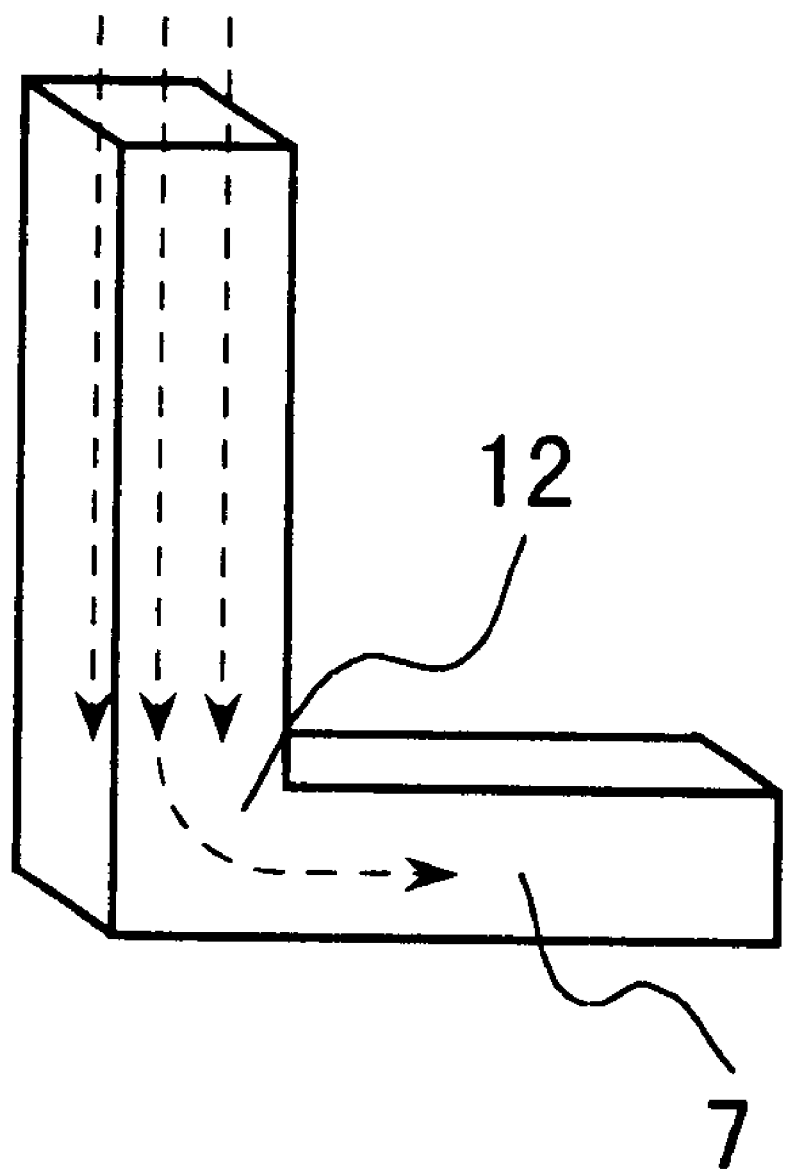
FIG. 11 is a perspective view showing a bend portion of the exhaust duct used for the battery assembly system according to the third embodiment of the present invention.

In this case, the air for forcibly cooling the battery assembly 4 flows in the cabin 1, the air inlet port 3, the battery assembly case 5, the exhaust duct 7, the cooling fan 6, the exhaust duct 7, the bend portion 12, and the exhaust duct 7 in this order. Therefore, the mist-state electrolyte, which is released from the cell 9 together with the air, flows into the exhaust duct 7 in a turbulent state, and the mist-state electrolyte reaches the bend portion 12. Then, a part of the mist-state electrolyte collides with and is attached to the wall surface of the bend portion 12 by the inertial force, and a part of the rest of the mist-state electrolyte collides with and is attached to the wall surface of the exhaust duct 7 due to the air being made turbulent by the bend portion (see FIG. 11). Thus, the mist-state electrolyte released from the cell 9 is captured inside the exhaust duct 7, so that it is possible to suppress the flow of mist-state electrolyte out of the exhaust duct 7.

It is desirable that the bend portion 12 of the exhaust duct 7 is provided with an angle of about 60° to 160°. In order to capture the mist, this angle is preferably large. However, for air flowing, this angle is preferably small. The trade-off point between the two conditions is thought to be about 60° to 160°. When the angle of the bend portion 12 is set to be in this range, the mist-state electrolyte released from the cells 9 can be captured inside the exhaust duct 7 effectively.

Furthermore, when the concave and convex portion (for example, a bellow-shaped portion) is provided on the inner wall of the exhaust duct 7, the efficiency of capturing a mist-state electrolyte can be enhanced.

Figure 12:
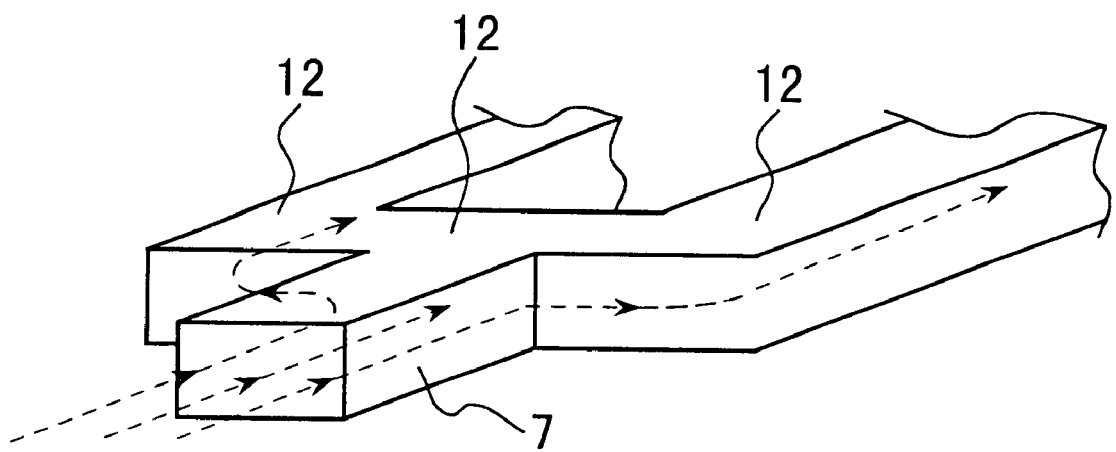
FIG. 12 is a perspective view showing bend portions, which are provided in a plurality of places, of the exhaust duct used for the battery assembly system according to the third embodiment of the present invention.

Furthermore, as shown in FIG. 12, when the exhaust duct 7 is branched, so that a plurality of bend portions are provided, the efficiency of capturing electrolyte can be enhanced further.

In this embodiment, the case where the bend portion 12 is provided behind the cooling fan 6 is described. However, the structure is not limited thereto, and even if the bend portion 12 is provided between the battery assembly case 5 and the cooling fan 6, the same effect can be obtained.

Furthermore, in this embodiment, the case where the cooling fan 6 is provided in the exhaust duct 7 is described. However, the cooling fan 6 is not necessarily provided in the exhaust duct 7, and even if the cooling fan is provided at the side of the air inlet portion 3, the predetermined object can be achieved.

As mentioned above, the first to third embodiments of the present invention are described, respectively. If at least two configurations from the first to third configurations are combined, the mist-state electrolyte released from the cell 9 can be captured effectively in the exhaust duct 7.

Furthermore, in the first to third embodiments of the present invention, the composition of the electrolyte released in a mist state from the cell is not particularly limited. However, when the electrolyte released from the cell is an alkaline electrolyte including potassium hydroxide as a main component, with the first to third embodiments of the present invention, the aerial concentration of the potassium hydroxide in the air of the cabin of the electric vehicle can be 2 mg/m³ or less. As a more preferable example, it can be 0.3 mg/m³ or less.

The invention may be embodied in other forms without departing from the spirit or essential characteristics thereof The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A battery assembly system used for an electric vehicle, comprising
    a battery assembly with a plurality of cells electrically connected,
    a battery assembly case for housing the battery assembly with the battery assembly being mechanically held,
    a fan for drawing air into the inside of the battery assembly case, and
    an exhaust passage for allowing air to be exhausted from the battery assembly case,
    wherein the exhaust passage is provided with a mechanism for capturing an electrolyte released in a mist state from the cell.

2. The battery assembly system according to claim 1, wherein the fan is provided in the exhaust passage and the electrolyte is captured by the fan.

3. The battery assembly system according to claim 2, wherein the fan is a sirocco fan or an axial-flow fan.

4. The battery assembly system according to claim 1, further comprising a filter in the exhaust passage, wherein the electrolyte is captured by the filter.

5. The battery assembly system used for an electric vehicle according to claim 4, wherein the filter can capture electrolyte released in a mist state having a particle size of 1 μm to 50 μm.

6. The battery assembly system according to claim 1, wherein the exhaust passage is an exhaust duct.

7. The battery assembly system according to claim 1, wherein the exhaust passage is an exhaust duct and the exhaust duct has a bend portion for capturing the electrolyte.

8. The battery assembly system according to claim 7, wherein the bend portion is provided with an angle of 60° to 160°.

9. The battery assembly system according to claim 1, wherein the exhaust passage is an exhaust duct and the exhaust duct is provided with a convex and concave portion on the inner wall for capturing the electrolyte.

10. The battery assembly system according to claim 1, wherein the electrolyte released in a mist state from the cell is an alkaline electrolyte including potassium hydroxide as a main component, and the aerial concentration of the potassium hydroxide in a cabin of the electric vehicle is 2 mg/m³ or less.

11. The battery assembly system according to claim 10, wherein the aerial concentration of the potassium hydroxide is 0.3 mg/m³ or less.

12. A battery assembly system used for an electric vehicle, comprising
    a battery assembly with a plurality of cells electrically connected,
    a battery assembly case for housing the battery assembly with the battery assembly mechanically held,
    a fan for drawing air into the inside of the battery assembly case, and
    an exhaust duct for allowing air to be exhausted from the battery assembly case,
    wherein an electrolyte released in a mist state from the cell is captured by at least two selected from the group consisting of the fan, a filter provided in the exhaust duct, a bend portion provided to the exhaust duct, and a convex and concave portion on the inner wall of the exhaust duct.

* * * * *